D. DRAPER.
Registering Thermometer.
No. 164,275. Patented June 8, 1875.
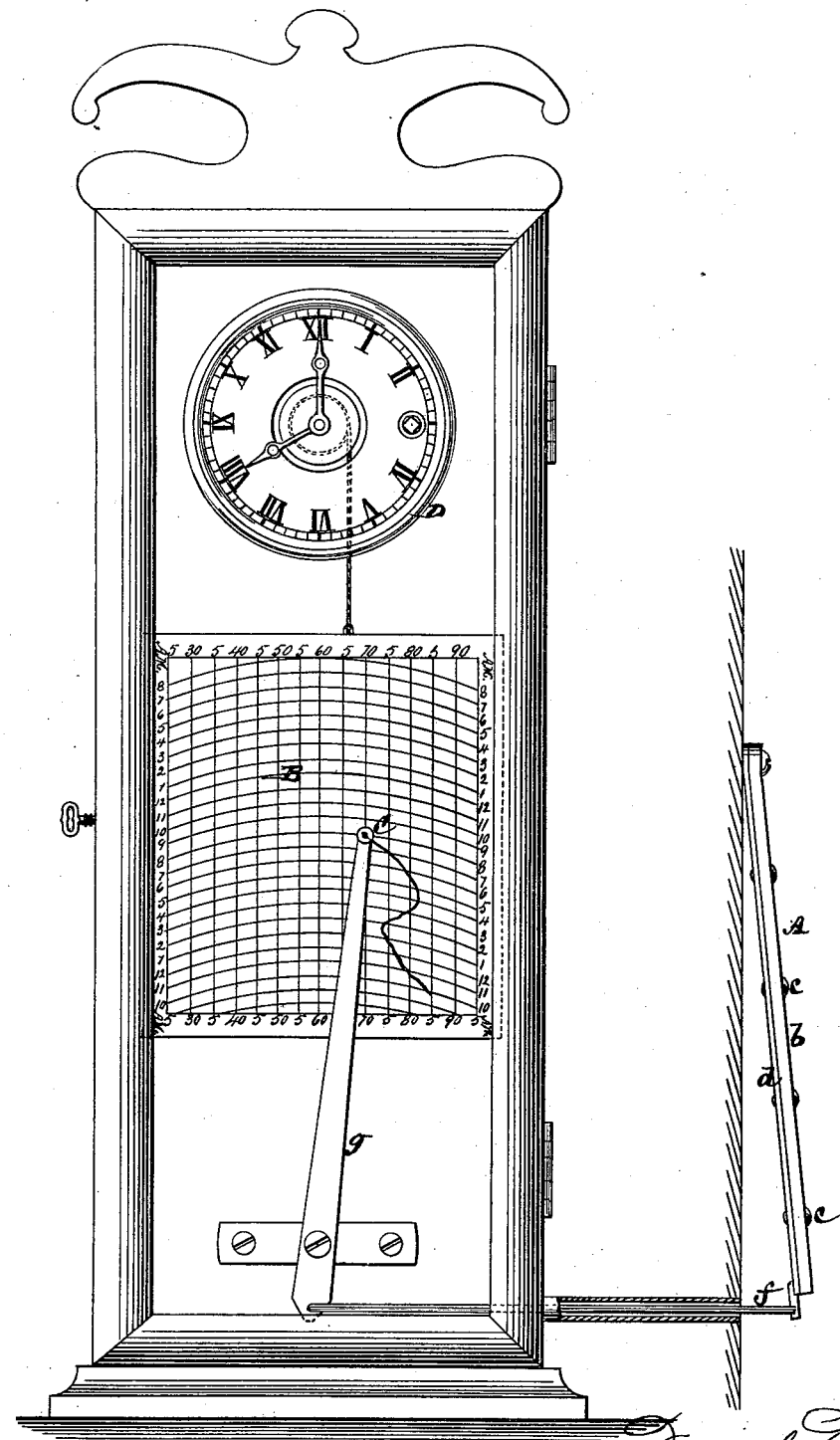

UNITED STATES PATENT OFFICE.

DANIEL DRAPER, OF NEW YORK, N. Y., ASSIGNOR TO GUISEPPE TAGLIABUE, OF SAME PLACE.

IMPROVEMENT IN REGISTERING-THERMOMETERS.

Specification forming part of Letters Patent No. 164,275, dated June 8, 1875; application filed March 4, 1875.

*To all whom it may concern:*

Be it known that I, DANIEL DRAPER, of the city of New York, in the county and State of New York, have invented certain new and useful Improvements in Self-Recording Thermometers, of which the following is a full, clear, and exact description, reference being had to the accompanying drawing, which forms part of this specification, and which represents a view, in elevation, of a self-recording thermometer constructed in accordance with my invention.

The one part of this invention consists in a self-recording thermometer composed of a strip of hard vulcanized rubber, and a strip of sheet brass or other metal, the two being secured together in any suitable way, as, for instance, by rivets at points throughout the length of the combined strip.

By this combination of hard rubber and metal I am enabled to avail myself, for thermometrical purposes, of the highly-expansive property of hard rubber, by utilizing the changes in flexure which will take place in the compound strip, consequent on its exposure to different temperatures. Such compound strip is but little liable to corrosion by atmospheric influence.

A registering-tablet or indicator-card is operated by the clock, and a pencil or other marker is actuated by the compound strip, whereby I produce a self-recording thermometer, which will give a continuous record in diagram form of the temperature at different periods of time.

The marker which I prefer to use for this purpose is a pointed glass tube, which is charged with a suitable colored fluid or prepared ink.

A in the drawing is a thermometer composed of a strip of hard rubber, $b$, and a strip of sheet-spring brass, $d$, riveted together, as at $c$, the whole forming a compound strip of the character hereinbefore specified. This compound strip is attached at its one, say, its upper, end to a wall or other fixture, which may be on the outside of a building, and the lower or opposite end of said strip, which, by the upper attachment, is kept free from contact with, and away from, the wall, has attached to it a rod or connection, $f$, for operating the recording pen, pencil, or marker. The connection $f$ may pass through a tube into the apartment in which the recording mechanism is arranged. B is an indicator-card or tablet, on which the changes of temperature are recorded or registered by diagram, in part through the instrumentality of a marker, C, carried by a lever, $g$, which is actuated by the flexure of the combined hard-rubber and metal strip A, and in part through the instrumentality of a clock, D, which traverses the indicator-card up or down across the path described by the vibrating marker.

In the drawing said card is represented as being carried by a sliding frame connected with the clock by a lifting or lowering cord or chain, and is shown as graduated in the one direction into hours or periods of time by curved lines corresponding with the sweep described by the marker C, and as graduated in an up and down or transverse direction by straight lines into spaces indicating different degrees of temperature. In this way, or by these means, as the marker is vibrated by the flexure of the strip A, consequent on variations in temperature, while the indicator-card is being traversed across the path of the marker, a diagram will be delineated on the card, showing the precise temperature at any particular hour or period of time.

Other modes of operating or "laying out" the card, however, might be adopted, and the latter either be arranged above or below the dial of the clock; also, a rotating indicator-card might be substituted for one moving in a straight direction.

The marker C it is proposed to make of a pointed glass tube, which I fill with a coloring-liquid or prepared ink; but a pencil or other description of marker may be substituted for it.

I claim—

A self-registering thermometer composed of the compound strip of hard rubber and metal, a marker, a time mechanism, and a movable tablet or indicator card, constructed and arranged to operate substantially as described.

DANIEL DRAPER.

Witnesses:
HENRY T. BROWN,
MICHAEL RYAN.